United States Patent
Zhan

(10) Patent No.: US 12,386,728 B2
(45) Date of Patent: Aug. 12, 2025

(54) TARGETED TESTING FOR MODULAR SOFTWARE APPLICATIONS

(71) Applicant: Procore Technologies, Inc., Carpinteria, CA (US)

(72) Inventor: Lichun Zhan, San Jose, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 91 days.

(21) Appl. No.: 17/735,659

(22) Filed: May 3, 2022

(65) Prior Publication Data

US 2023/0359547 A1 Nov. 9, 2023

(51) Int. Cl.
*G06F 11/3668* (2025.01)

(52) U.S. Cl.
CPC ...... *G06F 11/3688* (2013.01); *G06F 11/3668* (2013.01)

(58) Field of Classification Search
CPC .......................... G06F 11/3688; G06F 11/368
See application file for complete search history.

(56) References Cited

U.S. PATENT DOCUMENTS

| | | | | |
|---|---|---|---|---|
| 7,614,042 | B1 * | 11/2009 | Hardy | G06F 11/3688 717/124 |
| 8,276,123 | B1 * | 9/2012 | Deng | G06F 11/368 717/124 |
| 11,573,885 | B1 * | 2/2023 | Eizenman | G06F 11/3684 |
| 12,014,304 | B2 * | 6/2024 | Man | G06V 10/82 |
| 2009/0144698 | A1 * | 6/2009 | Fanning | G06F 11/3676 717/120 |
| 2014/0181791 | A1 * | 6/2014 | Amano | G06F 11/3664 717/121 |
| 2017/0329699 | A1 * | 11/2017 | Adinarayan | G06F 11/368 |
| 2018/0095867 | A1 * | 4/2018 | Varadarajan | G06F 11/3688 |

(Continued)

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

(Continued)

*Primary Examiner* — Wei Y Zhen
*Assistant Examiner* — Brahim Bourzik
(74) *Attorney, Agent, or Firm* — Lee Sullivan Shea & Smith LLP

(57) ABSTRACT

An example computing platform is configured to identify a subset of source code files for a modular software application that have changed. The computing platform further creates a dynamic test plan comprising a targeted subset of available software tests by (i) obtaining a dependency map that identifies various dependency relationships between the software application's modules, (ii) based on the dependency map, generating an impact map that identifies various impact relationships between the software application's modules, (iii) based on the impact map, generate a test map that identifies various tests that correspond to the software application's modules, and (iv) select the targeted subset of available software tests based on the test map and the identified subset of source code files. Finally, the computing platform executes the dynamic test plan comprising the targeted subset of available tests.

20 Claims, 7 Drawing Sheets

(56) References Cited

U.S. PATENT DOCUMENTS

| | | | | |
|---|---|---|---|---|
| 2018/0239688 A1* | 8/2018 | Gupta | ................ | G06F 11/3684 |
| 2018/0349257 A1* | 12/2018 | Bhattacharjee | ..... | G06F 11/3688 |
| 2020/0125485 A1* | 4/2020 | Wiener | ............... | G06F 11/3688 |
| 2020/0394127 A1* | 12/2020 | Hicks | ................ | G06F 11/3692 |
| 2022/0171510 A1* | 6/2022 | Fredericks | ............. | G06V 20/50 |

OTHER PUBLICATIONS

"Gradle 7.4.2 User Manual—Testing in Java and JVM Projects," available at https://docs.gradle.org/7.4.2/userguide/java_testing.html (last visited Feb. 14, 2023).

* cited by examiner

```
Core:
    [ ]

CoreUnitTests:
    [ Core ]

BIM:
    [ Core;
      UI ]

BIMUnitTests:
    [ Core;
      BIM ]

Drawings:
    [ Core;
      UI ]

DrawingsUnitTests:
    [ Core;
      Drawings ]

UI:
    [ Core ]

UIUnitTests:
    [ Core;
      UI ]
```

```
Core:
    [ CoreUnitTests;
      BIM;
      BIMUnitTests;
      Drawings;
      DrawingsUnitTests;
      UI;
      UIUnitTests ]

BIM:
    [ BIMUnitTests ]

Drawings:
    [ DrawingsUnitTests ]

UI:
    [ BIM;
      Drawings;
      UIUnitTests ]
```

```
Core:
    [ CoreUnitTests;
      BIMUnitTests;
      BIMSnapshotTests;
      DrawingsUnitTests;
      DrawingsSnapshotTests;
      UIUnitTests;
      UISnapshotTests ]

BIM:
    [ BIMUnitTests;
      BIMSnapshotTests ]

Drawings:
    [ DrawingsUnitTests;
      DrawingsSnapshotTests ]

UI:
    [ BIMUnitTests;
      BIMSnapshotTests;
      DrawingsUnitTests;
      DrawingsSnapshotTests;
      UIUnitTests;
      UISnapshotTests ]
```

FIG. 5C

TARGETED TESTING FOR MODULAR SOFTWARE APPLICATIONS

BACKGROUND

The process of developing a new software application or an updated version of an existing software application is often referred to as the software development lifecycle. The software development lifecycle can involve different sub-processes depending on the software application under development, but typically involves at least (i) a conceptual phase in which the intended functionalities of the new or updated software application are defined, (ii) a planning phase in which the budgets, timelines, and actionable tasks for building the new or updated software application are defined, (iii) a build phase in which the software application is developed, typically by employing multiple rounds of coding and testing, and (iv) a deployment phase in which the application is deployed to end users. The software development lifecycle may additionally include one or more post-deployment phases, such as a support or maintenance phase in which the software application is further developed by performing additional coding and testing to address bugs, errors, security vulnerabilities, performance issues, user experience issues, or any other aspects of the software application identified for further improvement.

Overview

A software application is comprised of a set of source code files that are collectively used to build the application. The source code files can be organized into various different code structures, one example of which is a modular code structure. When developing a software application according to a modular code structure, different functionalities of the application are coded into separate code structures known as module code structures, also referred to herein more generally as "modules." Each module is typically made up of, or otherwise associated with, a subset of the source code files, and the source code files for a given module may then be compiled into object code that is executable to perform one or more functionalities of the application.

The modular software application may additionally include or be associated with a set of test code files that are used to test various functionalities of the application. The set of test code files may include one or more test code structures, which may be similar in form to modules in that each test code structure may be made up of, or otherwise associated with, a subset of the test code files. The test code files for a given test code structure may be compiled into object code that is executable to perform one or more software tests to evaluate and assess the functionality of the source code. In some examples, each test code structure may be compiled into executable code for evaluating and assessing a particular one of the modules or a subset of the module's source code files. Common examples of software tests include unit tests and snapshot tests, but the test code files for a given test may include code that is executable to perform other types of software tests as well.

Further yet, some of the source code files may take the form of global source code files that are not specific to a particular module or test code structure. Such global source code files may take various forms. For instance, some global source code files may include encode functionality or information that is applicable to multiple different modules. An example of such a global source code file may include a configuration file or the like. Other global source code files may have no impact on the functionality of the modules, an example of which may include a readme text file or the like.

In order to help establish a modularized source code structure, such as that described above, the application may include, or otherwise be associated with, one or more data objects that define the modules, the test code structures, and their relationships to their respective subsets of source code or test code files.

To illustrate, consider the Xcode® integrated development environment (IDE), which may be used to develop software applications for running on the Apple® iOS operating system. A computing platform using the Xcode® IDE to develop a software application may create data objects referred to as "targets," each target representing a particular one of the various modules and test code structures of the application. Each Xcode® target specifies a product to build and contains the instructions for building the product from a set of files. In this manner, the computing platform may create, for any given module of the software application, a module target that identifies the source code files for that given module as well as instructions for processing the identified source code files to build the given module, and the computing platform may create, for any given test of the software application, a test target that identifies the test code files for that given test as well as instructions for processing the identified test code files to build the given test. The targets may identify their respective sets of source code or test code files in various ways. As one example, a target, such as a module target or a test target, may include or identify a particular directory, and the computing platform may associate the target with its source code or test code files by storing the target's files in the particular directory of the target. As another example, the computing platform may associate the target with its source code or test code files by defining pointers that point the target to its files or that point the files to their target. Other examples are possible as well.

The source code may further include, or otherwise be associated with, one or more data objects that define the relationships between different modules and/or different tests. Again, the Xcode® IDE is illustrative in this regard. For instance, a computing platform using the Xcode® IDE to develop a software application may create a project data object (e.g., a .xcodeproj data object) representing the entire application. An Xcode® project data object is a repository for all the files, resources, and information required to build the software application. In this manner, the project data object may contain the targets of the software application and may maintain the relationships between the targets. For instance, an Xcode® project data object may include a configuration file (e.g., a project.pbxproj file) that identifies dependencies (and/or other relationships) between the targets, such as dependencies between different module targets, dependencies between different test targets, and dependencies between module targets and test targets. A dependency may arise when the source code in a first source code file of a first target references a second source code file of a second target. When this occurs, the first target is said to be dependent on the second target, and the project data object for the software application may include data identifying this dependency as well as any other inter-target dependencies.

Throughout the present disclosure, examples of the disclosed technology will be described in the context of developing iOS software applications using the Xcode® IDE. As such, the examples described herein may refer to operations involving module targets, test targets, and/or .xcodeproj data objects. However, it should be understood that this is for illustrative purposes only and that the operations described herein may also be applied to data objects that represent modules, targets, and/or projects in different manners as well, to the extent possible.

Working with a modular software application such as that described above, the computing platform may be configured to use the test targets to test the source code many times during the software development lifecycle. As described herein, each iteration of testing the source code using one or more test targets is referred to as performing a "test cycle." In some cases, the computing platform may perform a test cycle every time the source code is updated, which may occur many times in a single day. For instance, the source code may be stored in a shared repository accessible by a team of software developers, and a given one of the developers may work on the source code by creating a local copy of the source code stored at the developer's client station. The developer may change the local source code by making updates, revisions, additions, or other changes to the code and may merge such local changes into the source code stored in the shared repository. This merging of source code into the shared repository is referred to as a "commit" operation. Depending on the size of the developer team, the timeline of the development project, or other factors, a computing platform may perform numerous commits in any given day, and each commit operation may trigger a separate test cycle to help ensure that the changes to the source code do not cause any unwanted errors or other malfunctions with the source code. Further, other operations may trigger a test cycle as well, such as build verification operations or code format changes. As such, the computing platform may perform test cycles many times throughout the development of an application.

When performing a test cycle, the computing platform may do so according to a predefined test plan that identifies which tests to perform during each test cycle. Referring again to the Xcode® IDE as an illustrative example, the predefined test plan for the software application may be encoded in the form of a data object that specifies some or all of the available test targets. Each time that the computing platform performs a test cycle, the computing platform may then execute the tests that correspond to all of the test targets specified in the predefined test plan. In this respect, the predefined test plan that is created for a software application needs to specify the entire universe of test targets that should be executed during each test cycle, and in most cases, this will include all available test targets that have been defined for the software application such that the computing platform performs all available tests on the source code. This approach of performing all available tests during each test cycle may be advantageous in situations where multiple developers are concurrently working on different aspects of the source code, as this may minimize the risk that changes to the source code by any given developer will not negatively impact the operation of the software application. However, as noted above, the computing platform may frequently perform test cycles, such as multiple times per day, and performing all available tests at such a high rate may result in a large amount of time and computational resources devoted to source code testing, which can in turn lead to various problems-including increasing the time and/or cost associated with releasing new or updated software applications.

One way to reduce the amount of time and computational resources spent on source code testing would be to reduce the number of tests executed in each test cycle. For instance, in theory, a developer or the like could review and manually revise the predefined test plan before each respective test cycle (e.g., by reconfiguring the test plan via a user interface of the computing platform as part of the commit process) to only specify a particular subset of the available tests that are to be executed during the respective test cycle. However, while this may reduce the computational time and resources utilized when carrying out each test cycle, requiring a developer to review and manually revise the predefined test plan prior to each test cycle may be time consuming and may offset any improvements to the computational time and resources utilized during the actual performance of the test cycles. Further, this technique may give rise to human error that could lead to various other problems. For instance, if a developer revises the test plan and fails to specify a test target for a module that was impacted by his or her changes to the source code, then performing a test cycle using the revised test plan may fail to detect one or more problems in the source code introduced by the changes. This could result in committing flawed source code to the repository, which could negatively impact the operation of the software application in ways that may delay the timeline of the software development lifecycle and/or degrade user experience.

To help address the aforementioned and other problems, disclosed herein is new software technology for automatically and intelligently creating and executing a dynamic test plan comprising a particular set of tests that is selected based on the source code that has been modified prior to executing the test plan, which may either comprise (i) a targeted set of tests that are applicable to the specific modules impacted by modifications to the source code or (ii) the full set of available tests, if warranted by the nature of the modified source code. Creating and executing such a dynamic test plan at each test cycle may help reduce the amount of computational resources expended on source code testing.

In practice, the disclosed software technology may be incorporated into the functionality of any computing platform that is configured to perform testing of the source code of a software application, among other possibilities.

In accordance with the present disclosure, when such a computing platform detects that a test cycle is to be carried out for the source code of a software application (e.g., when a commit operation is performed, or when the source code is otherwise changed or updated from a previous version to a current version), the computing platform may begin by identifying a set of source code files that have been changed since some previous reference point (e.g., since a last test cycle was performed). The computing platform may make such an identification by submitting a query, such as a git command, to the source code repository for a list of changed files.

Once the computing platform has identified the set of changed source code files, the computing platform may evaluate each changed source code file in the identified set to determine a test category associated with the file. In one implementation, the possible test categories may include: (1) an "ignore" category, which applies to a changed source code file that does not impact the functionality of the software application in a way that warrants testing, such as readme text files, (2) a "full" category, which applies to a changed source code file that impacts the functionality of the software application to an extent that warrants executing the full set of available tests (e.g., global source code files that affect multiple modules of the software application), and (3) a "modules" category, which applies to a changed source code file that affects only a particular one of the modules. However, other types of categorizations for the changed files are possible as well.

Based on the categories of the changed source code files in the identified set, the computing platform may then proceed in one of the three possible manners. First, if all of the changed source code files in the identified set are found to be within the "ignore" test category, then the computing platform may determine that no testing is necessary at this time and may allow the changes to the source code files to be made without running any tests on those changed files. Second, if any one of the changed source code files in the identified set is found to be within the "full" test category, then the computing platform may determine that a "full" test cycle needs to be carried out and then create a dynamic test plan for the test cycle comprising the full set of available tests for all of the software application's modules. Third, if none of the changed files are in the "full" test category and at least one of the changed files is in the "module" test category, the computing platform may determine that a "targeted" test cycle should be carried out and then create a dynamic test plan for the test cycle comprising a targeted subset of available tests that are applicable to the particular modules impacted by the changed source code files-which may involve an evaluation and determination of which particular tests to include within the dynamic test plan.

The computing platform may make the determination of which particular tests to include within the dynamic test plan for a "targeted" test cycle in various ways. As one possibility, the computing platform may begin by obtaining data defining the dependencies of the software application's modules. For instance, in line with the discussion above, if the software application is being developed in the Xcode® IDE, the computing platform may obtain a project.pbxproj file for the software application, which defines the dependencies of the software application's module targets. However, the data defining the dependencies of the software application's modules may take other forms as well.

As noted above, the data defining the dependencies of the software application's modules may identify, for each respective module of the software application, any other modules on which the respective module depends. For example, such data may specify that a first module of the software application depends on a first set of one or more modules, a second module of the software application depends on a second set of one or more modules, and so on for each respective module of the software application.

The computing platform may then use this data defining the dependencies of the software application's modules to generate a "dependency map" for the software application that identifies, for each respective module of the software application, any other modules on which the respective module depends. To illustrate, consider a software application that includes three modules Module A, Module B, and Module C. An example dependency map may indicate that (i) Module A depends on both Module B and Module C, (ii) Module B has no dependencies, and (iii) Module C depends on Module B. However, this is a simplified example for illustrative purposes only, and other examples are possible as well.

After generating the dependency map for the software application, the computing platform may then invert the dependency map in order to generate an "impact map" for the software application that identifies, for each respective module of the software application, any other module that depends on the respective module (which are also referred to herein as "impacted modules"). To illustrate, inverting the example dependency map described above would result in an impact map that indicates (i) Module A has no impacted modules (because no module depends on Module A), (ii) Module B's set of impacted modules include Module A and Module C (because Module A and Module C depend on Module B), and (iii) Module C's set of impacted modules include Module A (because Module A depends on Module C). Again, this is a simplified example for illustrative purposes only, and other examples are possible as well.

After generating the impact map for the software application, the computing platform may then generate a "test map" that identifies, for each respective module of the software application, a respective set of one or more tests that correspond to the respective module. In this respect, the computing platform may determine the respective set of one or more tests corresponding to each respective module by (i) identifying any test that directly corresponds to the respective module and (ii) using each respective module's set of one or more "impacted modules" as a basis for identifying one or more tests that indirectly correspond to the respective module. In this respect, as noted above, each module of the software application may have one or more corresponding test targets for that module, and the one or more corresponding test targets may identify one or more tests for testing the module (e.g., one or both of a unit test or a snapshot test). As such, in at least some implementations, the function of using a given module's set of one or more "impacted modules" as a basis for determining a given set of tests that correspond to the given module may involve identifying each of the impacted module's corresponding one or more test targets for execution.

To illustrate with the example described above, if Module C has an impact on Module A, where Module C has corresponding tests called "ModuleCUnitTests" and "ModuleCSnapshotTests" and Module A has corresponding tests called "ModuleAUnitTests" and "ModuleASnapshotTests," then the computing platform may determine that the respective set of one or more tests corresponding to Module C includes (i) "ModuleCUnitTests" and "ModuleCSnapshotTests" (which directly correspond to Module C) and (ii) "ModuleAUnitTests" and "ModuleASnapshotTests" (which indirectly correspond to Module C via the impact relationship with Module A). Many other examples are possible as well.

After generating the test map, the computing platform may then select the targeted subset of available tests to include in the dynamic test plan based on the generated test map and the subset of changed source code files that are determined to be within the "module" test category. For instance, the computing platform may make this selection by performing the following functions for each changed source code file that falls within the "module" test category: (i) determine a given module to which the changed source code file belongs, (ii) based on the test map, identify the respective set of one or more tests that correspond to the given module, and then (iii) add the respective set of one or more tests that is identified for the particular module to the targeted subset of available tests to be included in the dynamic test plan. For instance, if one of the changed files in the above example belongs to Module C, the computing platform may use the test map to identify the respective set of tests corresponding to Module C, which, as noted above, may include tests called "ModuleCUnitTests," "ModuleCSnapshotTests," "ModuleAUnitTests," and "ModuleASnapshotTests," and may then add this respective set of tests for Module C to the targeted subset of available tests that are to be included in the dynamic test plan. Again, many other examples are possible as well.

Lastly, after the computing platform has created the dynamic test plan for the test cycle in the manner described above, the computing platform may carry out the test cycle by executing the tests included within the dynamic test plan.

In this way, the computing platform may intelligently assess which specific tests are to be executed on a per test cycle basis by evaluating the particular source code files that have been changed. Namely, the computing platform may skip testing altogether in some circumstances, conduct a full test cycle by executing the full set of available tests in other circumstances where the changed source code files warrant it, and perform a targeted test cycle by executing only a targeted subset of the available tests in still other circumstances where it is unnecessary to carry out the full battery of tests.

In accordance with the above, in one aspect, disclosed herein is a method that involves (i) identifying, from a set of source code files for a software application comprising a plurality of modules, a first subset of source code files that have changed relative to a prior state of the source code; (ii) based on an evaluation of the first subset of source code files, determining that a targeted test cycle is to be run for the software application; (iii) in response to determining that the targeted test cycle is to be run for the software application, creating a dynamic test plan comprising a targeted subset of available tests by: (a) obtaining a dependency map that identifies, for each respective module of at least a first subset of the software application's plurality of modules, any other module of the software application on which the respective module directly depends; (b) based on the dependency map, generating an impact map that identifies, for each respective module of at least a second subset of the software application's plurality of modules, a respective set of one or more other modules of the software application that are impacted by the respective module; (c) based on the impact map, generating a test map that identifies, for each respective module of at least the second subset of the software application's plurality of modules, a respective set of one or more tests that correspond to the respective module; and (d) based on the generated test map and the first subset of source code files, selecting the targeted subset of available tests for the dynamic test plan; and (iv) initiating the targeted test cycle by executing the dynamic test plan comprising the targeted subset of available tests.

In another aspect, disclosed herein is a computing system that includes at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable medium comprising program instructions that are executable to cause a computing system to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 5A depicts an example dependency map for use in performing targeted testing of a software application during development.

FIG. 5B depicts an example impact map for use in performing targeted testing of a software application during development.

FIG. 5C depicts an example test map for use in performing targeted testing of a software application during development.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example System Configuration

As described above, the present disclosure generally relates to improved software technology for automatically and intelligently creating and executing a dynamic test plan for testing the source code of a software application, where the dynamic test plan includes a particular set of tests that is selected based on the source code that has been modified prior to executing the test plan. The disclosed technology may be incorporated into a software as a service ("SaaS") application, which may include back-end software that runs on a back-end computing platform and front-end software that runs on users' client stations (e.g., in the form of a native application, a web application, and/or a hybrid application, etc.) and can be used to access the SaaS application via a data network, such as the Internet. However, it should be understood that the disclosed technology may also be incorporated into software applications that take other forms as well.

Figure 1:
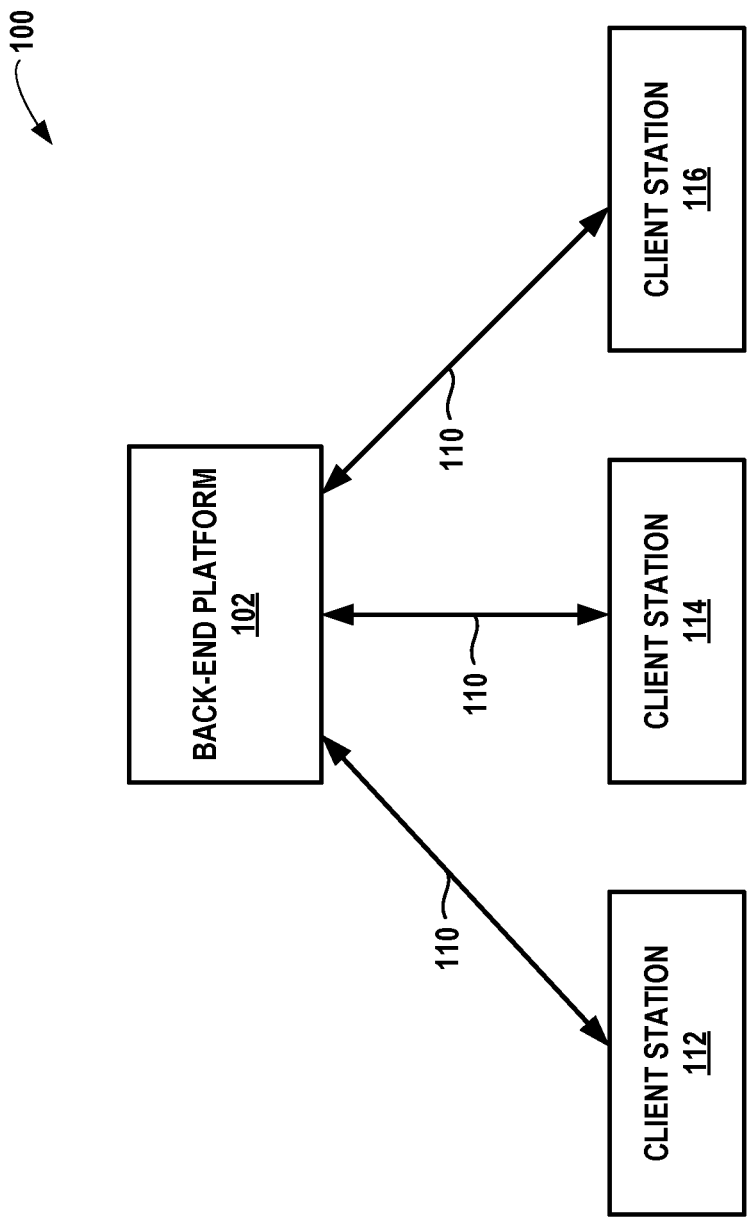
FIG. 1 depicts an example software development environment in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as client stations 112.

Broadly speaking, back-end computing platform 102 may comprise one or more computing systems that have been provisioned with software for carrying out one or more of the functions disclosed herein, including but not limited to providing tools and/or interfaces for creating, accessing, editing, and testing the source code of a software application. The one or more computing systems of back-end computing platform 102 may take various forms and may be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS) or the like. As another possibility, back-end computing platform 102 may comprise one or more dedicated servers that have been provisioned with software for carrying out one or more of the functions disclosed herein. Other implementations of back-end computing platform 102 are possible as well.

In turn, client stations 112 may each be any computing device that is capable of running the front-end software disclosed herein. In this respect, client stations 112 may each include hardware components such as a processor, data storage, a user interface, and a network interface, among others, as well as software components that facilitate the client station's ability to run the front-end software disclosed herein (e.g., operating system software, web browser software, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end computing platform 102 is configured to interact with client stations 112 over respective communication paths 110. In this respect, each communication path 110 between back-end computing platform 102 and one of client stations 112 may generally comprise one or more communication networks and/or communications links, which may take any of various forms. For instance, each respective communication path 110 with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with back-end computing platform 102 may be wireless, wired, or some combination thereof, and may carry data according to any of various different communication protocols. Although not shown, the respective communication paths 110 between client stations 112 and back-end computing platform 102 may also include one or more intermediate systems. For example, it is possible that back-end computing platform 102 may communicate with a given client station 112 via one or more intermediary systems, such as a host server (not shown). Many other configurations are also possible.

The interaction between client stations 112 and back-end computing platform 102 may take various forms. As one possibility, client stations 112 may send certain user input related to the source code of a software application to back-end computing platform 102, which may in turn trigger back-end computing platform 102 to take one or more actions based on the user input. As another possibility, client stations 112 may send a request to back-end computing platform 102 for certain source code data and/or a certain front-end software module, and client stations 112 may then receive project-related data (and perhaps related instructions) from back-end computing platform 102 in response to such a request. As yet another possibility, back-end computing platform 102 may be configured to "push" certain types of data to client stations 112, in which case client stations 112 may receive data (and perhaps related instructions) from back-end computing platform 102 in this manner. As still another possibility, back-end computing platform 102 may be configured to make certain types of data available via an API, a service, or the like, in which case client stations 112 may receive data from back-end computing platform 102 by accessing such an API or subscribing to such a service. The interaction between client stations 112 and back-end computing platform 102 may take various other forms as well.

Although not shown in FIG. 1, back-end computing platform 102 may also be configured to receive data, such as data related to the source code of a software application, from one or more external data sources, such as an external database and/or another back-end computing platform or platforms. Such data sources—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or fewer of the pictured components.

II. Example Computing Platform

Figure 2:
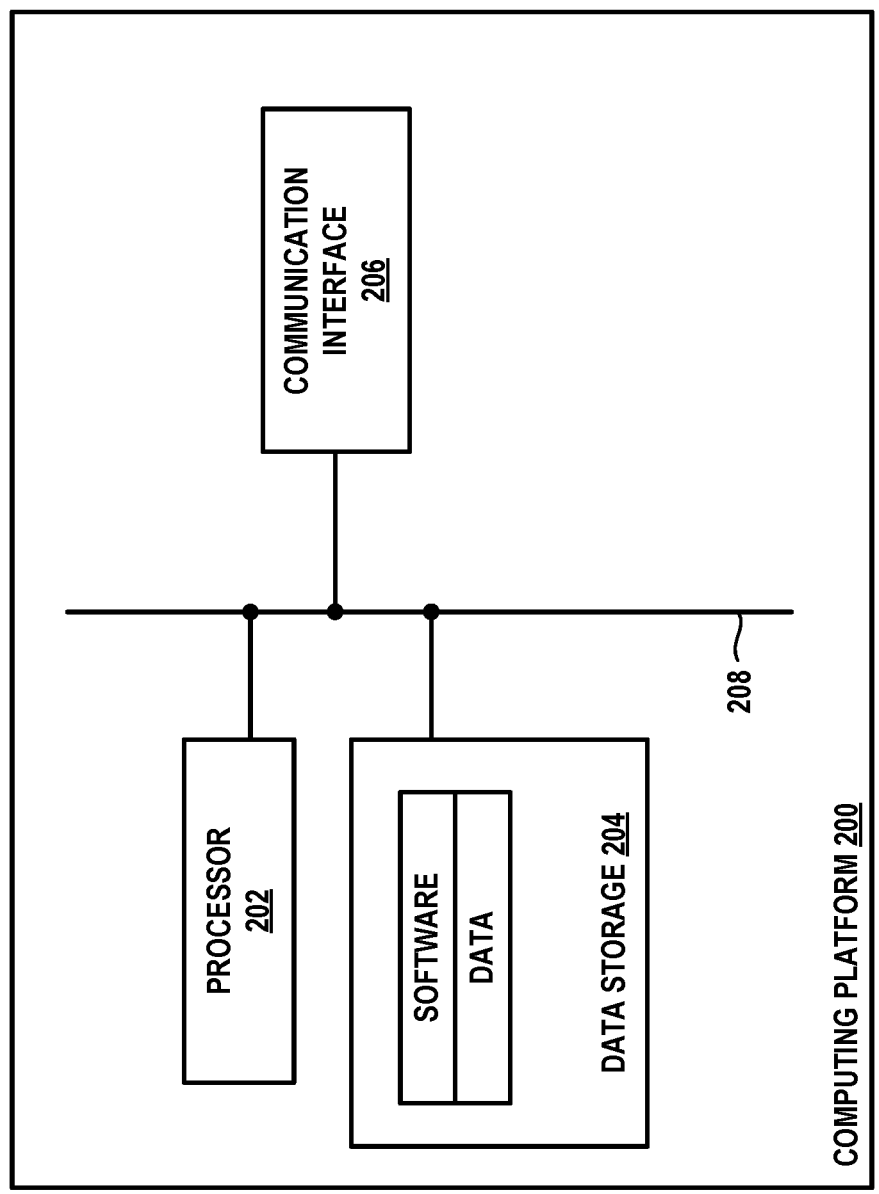
FIG. 2 depicts an example computing platform that may be configured to carry out one or more of the functions according to the disclosed technology.

FIG. 2 is a simplified block diagram illustrating some structural components that may be included in an example computing platform 200, which could serve as the back-end computing platform 102 of FIG. 1. In line with the discussion above, the computing platform 200 may generally comprise one or more computer systems (e.g., one or more servers), and these one or more computer systems may collectively include at least a processor 202, a data storage 204, and a communication interface 206, all of which may be communicatively linked by a communication link 208 that may take the form of a system bus, a communication network such as a public, private, or hybrid cloud, or some other connection mechanism.

The processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that the processor 202 could comprise processing components that are distributed across a plurality of physical computing devices connected via a network, such as a computing cluster of a public, private, or hybrid cloud.

In turn, the data storage 204 may comprise one or more non-transitory computer-readable storage mediums that are collectively configured to store (i) program instructions that are executable by the processor 202 such that the computing platform 200 is configured to perform some or all of the disclosed functions and (ii) data that may be received, derived, or otherwise stored, for example, in one or more databases, file systems, or the like, by the computing platform 200 in connection with the disclosed functions. In this respect, the one or more non-transitory computer-readable storage mediums of the data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 204 may comprise computer-readable storage mediums that are distributed across a plurality of physical computing devices connected via a network, such as a storage cluster of a public, private, or hybrid cloud. The data storage 204 may take other forms and/or store data in other manners as well.

The communication interface 206 may be configured to facilitate wireless and/or wired communication with external data sources and/or client stations, such as the client stations 112 in FIG. 1. Additionally, in an implementation where the computing platform 200 comprises a plurality of physical computing devices connected via a network, the communication interface 206 may be configured to facilitate wireless and/or wired communication between these physical computing devices (e.g., between computing and storage clusters in a cloud network). As such, the communication interface 206 may take any suitable form for carrying out these functions, examples of which may include an Ethernet interface, a Wi-Fi network interface, a cellular network interface, a serial bus interface (e.g., Firewire, USB 3.0, etc.), a chipset and antenna adapted to facilitate wireless communication (e.g., using short-range wireless protocols), and/or any other interface that provides for wireless and/or wired communication, among other possibilities. The communication interface 206 may also include multiple communication interfaces of different types. Other configurations are possible as well.

Although not shown, the computing platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the computing platform 200.

It should be understood that the computing platform 200 is one example of a computing platform that may be used with the embodiments described herein. Numerous other arrangements are possible and contemplated herein. For instance, other computing platforms may include additional components not pictured and/or more or fewer of the pictured components.

III. Example Client Station

Figure 3:
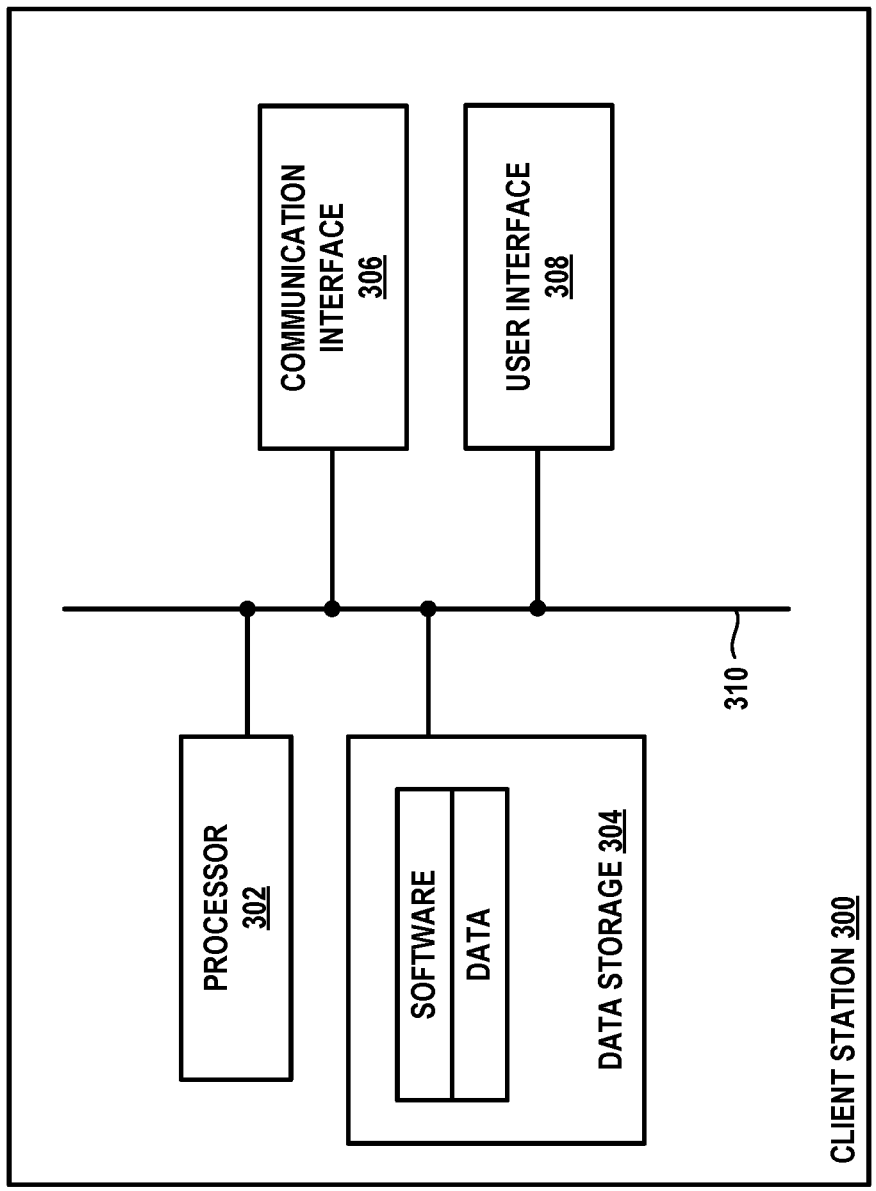
FIG. 3 depicts an example client device that may be configured to carry out one or more of the functions according to the disclosed technology.

FIG. 3 is a simplified block diagram illustrating some structural components that may be included in an example client device 300, which could serve as any of the client devices 112 of FIG. 1. As representative examples, the client device 300 may take the form of a desktop computer, a laptop, a netbook, a tablet, a smartphone, and/or a personal digital assistant (PDA), among other possibilities. In this respect, the client device 300 may include at least a processor 302, a data storage 304, a communication interface 306, and a user interface 308, all of which may be communicatively linked by a communication link 310 that may take the form of a system bus, a communication network such as a public, private, or hybrid cloud, or some other connection mechanism.

The processor 302 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed.

In turn, the data storage 304 may comprise one or more non-transitory computer-readable storage mediums that are collectively configured to store (i) program instructions that are executable by the processor 302 such that the client device 300 is configured to perform some or all of the disclosed functions and (ii) data that may be received, derived, or otherwise stored by the client device 300 in connection with the disclosed functions. In this respect, the one or more non-transitory computer-readable storage mediums of the data storage 304 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. The data storage 304 may take other forms and/or store data in other manners as well.

The communication interface 306 may take the form of any one or more interfaces that facilitate communication between the client device 300 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

The user interface 308 may take the form of one or more components that facilitate user interaction with the client device 300, such as a keyboard, a mouse or trackpad, a display screen, a touch-sensitive interface, a stylus, a virtual-reality headset, and/or speakers, among other possibilities.

It should be understood that the client device 300 is one example of a client device that may be used with the embodiments described herein. Numerous other arrangements are possible and contemplated herein. For instance, other client devices may include additional components not pictured and/or more or fewer of the pictured components.

IV. Example Functionality

As described above, the present disclosure generally relates to improved software technology for automatically and intelligently creating and executing a dynamic test plan for testing the source code of a software application, where the dynamic test plan includes a particular set of tests that is selected based on the source code that has been modified prior to executing the test plan.

Figure 4:
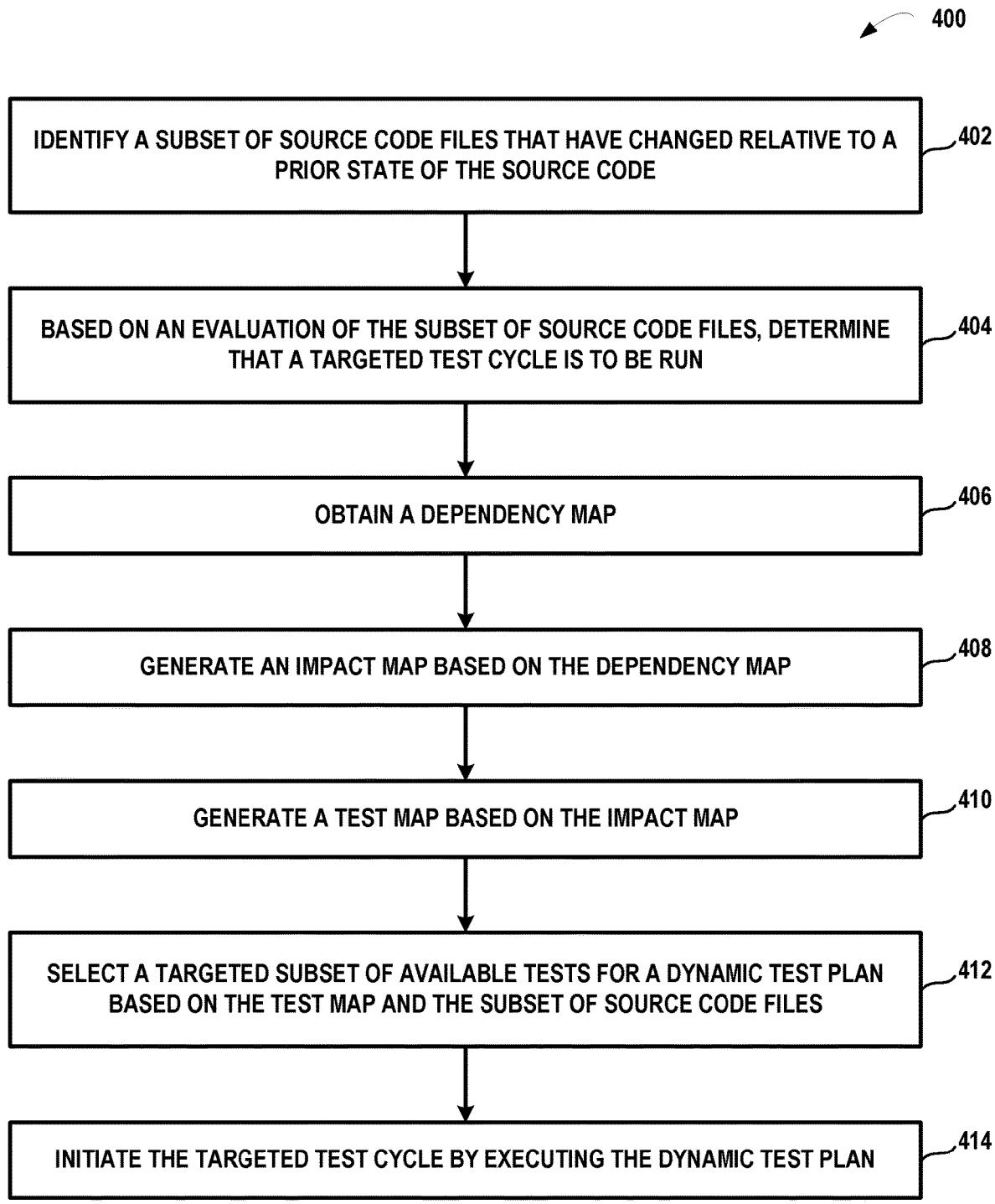
FIG. 4 depicts an example process for performing targeted testing of a software application during development.

Turning to FIG. 4, a flowchart 400 is shown that includes example operations that may be carried out to facilitate the creation and execution of a dynamic test plan for performing a test cycle on the source code of a software application that has a plurality of modules. The example operations will be discussed with reference to a computing platform that may carry out the example operations. In this regard, the computing platform may be similar to the back-end computing platform 102 of FIG. 1 and/or the computing platform 200 of FIG. 2. In some implementations, however, some or all of the example operations may be carried out by a client station, which may be similar to any of the client stations 112 of FIG. 1 and/or the client station 300 of FIG. 3.

The computing platform may carry out the operations depicted in the flowchart 400 to perform a test cycle on the source code at various times. In some cases, the computing platform may perform such a test cycle when the source code is changed. For example, the computing platform may carry out a test cycle in response to a request to perform a commit operation in which changes to the source code are merged into a shared source code repository. Other operations may trigger a test cycle as well, such as build verification operations or code format changes. As such, the computing platform may carry out the operations depicted in the flowchart 400 many times throughout the development of the software application.

Turning now to the operations of flowchart 400, at block 402, the computing platform may identify, from among a set of source code files for a software application that includes a plurality of modules, a subset of source code files that have changed relative to a prior state of the source code. The computing platform may identify the subset of source code files in various ways. In some examples, the computing platform may be provisioned with software specifically configured to track file changes, such as git software. In such a scenario, the computing platform may execute a git command, such as a "git diff" command, on the source code repository to retrieve a list of source code files that have changed since a previous commit. However, this example is merely illustrative, and the computing platform may use any other file comparison technique now known or later developed to identify the changed subset of source code files.

At block 404, based on an evaluation of the identified subset of source code files, the computing platform may determine that a targeted test cycle is to be run for the software application. The evaluation of the identified subset of source code files may take various forms. For example, in line with the discussion above, the computing platform may evaluate each changed source code file in the identified set to determine a test category associated with the file. In one implementation, the possible test categories may include: (1) an "ignore" category, which applies to a changed source code file that does not impact the functionality of the software application in a way that warrants testing, such as readme text files, (2) a "full" category, which applies to a changed source code file that impacts the functionality of the software application to an extent that warrants executing the full set of available tests (e.g., global source code files that affect multiple modules of the software application), and (3) a "modules" category, which applies to a changed source code file that affects only a particular one of the modules. However, other types of categorizations for the changed files are possible as well.

Prior to evaluating the identified subset of source code files, such as prior to performing the operations in the flowchart 400, the computing platform may predefine the test category for each source code file. For instance, when the computing platform first creates a source code file or after creating the source code file, the computing platform may assign one of the test categories to the source code file. For instance, the computing platform may receive user input specifying the test category for the source code file and store the specified test category in association with the source code file, such as in the form of metadata. In this manner, the computing platform may assign respective test categories to all of the source code files of the software application. Then, when evaluating the identified subset of source code files, the computing platform may refer to the predefined test category for each respective source code file in the subset to determine the respective categories of the changed source code files in the identified subset.

Based on the categories of the changed source code files in the identified subset, the computing platform may then proceed in one of the three possible manners. First, if all of the changed source code files in the identified set are found to be within the "ignore" test category, then the computing platform may determine that no testing is necessary at this time and may allow the changes to the source code files to be made, such as by committing the changed source code to the source code repository, without running any tests on those changed files. Second, if any one of the changed source code files in the identified set is found to be within the "full" test category, then the computing platform may determine that a "full" test cycle needs to be carried out and then create a dynamic test plan for the test cycle comprising the full set of available tests for all of the software application's modules. Third, if none of the changed files are in the "full" test category and at least one of the changed files is in the "module" test category, the computing platform may determine that a "targeted" test cycle should be carried out and then create a dynamic test plan for the test cycle comprising a targeted subset of available tests that are applicable to the particular modules impacted by the changed source code files-which may involve an evaluation and determination of which particular tests to include within the dynamic test plan.

In the example depicted in FIG. 4, at block 404, the computing platform determines that a targeted test cycle is to be run, which, as noted above, the computing platform may determine based on the identified subset of source code files including at least one file in the "module" test category and no files in the "full" test category.

In response to determining that the targeted test cycle is to be run for the software application, the computing platform may create a dynamic test plan that comprises a targeted subset of available tests. Blocks 406 through 412 of the flowchart 400 depict example operations that the computing platform may carry out to create the dynamic test plan.

At block 406, the computing platform may obtain a dependency map that identifies, for each respective module of at least a first subset of the software application's modules, any other module of the software application on which the respective module directly depends. In some examples, the first subset of the software application's modules includes all of the software application's modules. In other examples, the first subset of the software application's modules includes only includes a portion of the software application's modules. In some examples, the dependency map may additionally identify other dependency relationships. For example, the dependency map may also identify, for each respective module of at least the first subset of modules, any test code structure on which the respective module directly depends. Still further, the dependency map may identify, for each respective test code structure of at least a first subset of the software application's test code structures, any module or other test code structure of the software application on which the respective test code structure directly depends. Other examples are possible as well.

The computing platform may obtain the dependency map in various ways, such as by accessing a previously-created dependency map or by generating a new dependency map. The computing platform may generate the dependency map based on data defining relationships between different modules and/or different test structures. As noted above, the data defining the dependencies of the software application's modules may identify, for each respective module or test code structure of the software application, any other modules or test code structures on which the respective module or test code structure depends. For example, such data may specify that a first module of the software application depends on a first set of one or more modules, a second module of the software application depends on a second set of one or more modules, and so on for each respective module of the software application.

As described above, one particular example of data defining relationships between different modules and test structures of a software application is a.xcodeproj project data object, which the computing platform may create when using the Xcode® IDE to develop the software application. Such a project data object represents the entire application and may define various parameters of the source code, which may include identifying dependencies between different module targets, dependencies between different test targets, and dependencies between module targets and test targets. However, the data defining relationships between different modules and/or different test code structures of the software application may take other forms as well.

Based on this relationship defining data, the computing platform may then generate a dependency map for the software application that identifies the dependency relationships of the modules and/or test code structures described above.

FIG. 5A depicts an example dependency map 500 that the computing platform may obtain for a construction management software application, such as the construction management software application offered by Procore Technologies, Inc., who is the assignee of the present application, and which includes various software features or tools to help facilitate collaboration between different parties involved in a construction project. As shown in FIG. 5A, the source code for such a construction management software application may include a "Core" module target corresponding to a module configured to provide various core functionalities of the software application, a "BIM" module target corresponding to a module configured to provide functionalities related to building information modeling (BIM) data, a "Drawings" module target corresponding to a module configured to provide functionalities related to technical drawings for a construction project, and a "UI" module target corresponding to a module configured to provide functionalities related to a user interface of the software application. As further shown in FIG. 5A, the source code for the construction management software application may additionally include a "CoreUnitTests" test target corresponding to one or more software tests for testing the functionalities of the "Core" module, a "BIMUnitTests" test target corresponding to one or more software tests for testing the functionalities of the "BIM" module, a "DrawingsUnitTests" test target corresponding to one or more software tests for testing the functionalities of the "Drawings" module, and a "UIUnitTests" test target corresponding to one or more software tests for testing the functionalities of the "UI" module. However, it should be understood that this simplified example is for illustrative purposes only and that, in practice, the software application may include more, fewer, and/or different module targets and test targets.

In the present example, and as shown by the dependencies identified in the dependency map 500, the "Core" module target may have no dependencies, the "CoreUnitTests" test target may depend on the "Core" module, the "BIM" module target may depend on the "Core" and "UI" module targets, the "BIMUnitTest" test target may depend on the "Core" and "BIM" module targets, the "Drawings" module target may depend on the "Core" and "UI" module targets, the "DrawingsUnitTests" test target may depend on the "Core" and "Drawings" module targets, the "UI" module target may depend on the "Core" module target, and the "UIUnitTests" test target may depend on the "Core" and "UI" module targets. Again, however, this is example is merely illustrative, and other dependencies are possible as well.

At block 408, based on the dependency map, the computing platform may generate an impact map that identifies, for each respective module of at least a second subset of the software application's modules, a respective set of one or more other modules of the software application that are impacted by the respective module. The second subset of the software application's modules may be the same as or different from the first subset of the software application's modules and may include all of the software application's modules or only a portion of the software application's modules. Further, in examples where the dependency map identifies dependency relationships involving test code structures as well, such as those described above, the impact map may likewise identify, for each respective module of at least the second subset of the software application's modules, a respective set of one or more test code structures of the software application that are impacted by the respective module.

In order to generate the impact map for the software application, the computing platform may invert the relationships identified in the dependency map, such that the impact map identifies, for each respective module and/or test code structure in the dependency map, any other module that depends on the respective module and/or test code structure (which are also referred to herein as "impacted modules" and "impacted test code structures," or as "impacted module targets" and impacted test targets" in examples based in the Xcode® IDE).

FIG. 5B depicts an example impact map 510 that the computing platform may generate by inverting the dependency map 500 in FIG. 5A. Namely, by inverting the dependency relationships for the "Core" module target, the computing platform includes an impact relationship for the "Core" module target in the impact map 510 that identifies that the "Core" module target impacts the "CoreUnitTests" test target, the "BIM" module target, the "BIMUnitTests" test target, the "Drawings" module target, the "DrawingsUnitTests" test target, the "UI" module target, and the "UIUnitTests" test target. This impact relationship for the "Core" module target results because each of the impacted module targets and test targets identified in the impact map 510 depends on the "Core" module target, as indicated by the dependency map 500. Similarly, by inverting the dependency relationships for the "BIM" module target, the computing platform includes an impact relationship for the "BIM" module target in the impact map 510 that identifies that the "BIM" module target impacts the "BIMUnitTests" test target. This impact relationship for the "BIM" module target results because the impacted "BIMUnitTests" test target depends on the "BIM" module target, as indicated by the dependency map 500. The computing platform may apply this process to the remaining module targets identified in the dependency map 500 to arrive at the impact map 510 depicted in FIG. 5B.

At block 410, based on the impact map, the computing platform may generate a test map that identifies, for each respective module in the impact map, a respective set of one or more tests that correspond to the respective module. As described above, this may involve the computing platform (i) identifying any test that directly corresponds to the respective module and (ii) using each respective module's set of one or more impacted modules and/or test code structures as a basis for identifying one or more tests that indirectly correspond to the respective module.

The computing platform may identify any test that directly corresponds to a respective module in the impact map in various ways. In some examples, the computing platform may identify any test that directly corresponds to a respective module in the impact map based on the respective module's corresponding test code structure(s). As noted above, each respective module of the software application may have one or more corresponding test code structures for that module. For instance, data defining relationships between different module targets and/or different test targets, such as a configuration file (e.g., a project.pbxproj data object or the like), may include data identifying which module targets correspond to which test targets. With such an arrangement, the computing platform may determine the test targets that directly correspond to a respective module target in the impact map to be any test target identified by the configuration file as corresponding to the respective module target.

In other examples, the computing platform may identify such directly corresponding tests by way of the impact map 510. Again, as noted above, each respective module of the software application may have one or more corresponding test code structures for that module, and, in some examples, this correspondence may be defined by way of the test code structures being dependent on the respective module. To illustrate with the example shown in FIG. 5A, the "Core-UnitTests" test target depends on the "Core" module target and may therefore be said to correspond with the "Core" module target. Likewise, the "BIMUnitTests" test target depends on the "BIM" module target and may therefore be said to correspond with the "BIM" module target, the "DrawingsUnitTests" test target depends on the "Drawings" module target and may therefore be said to correspond with the "Drawings" module target, and the "UIUnitTests" test target depends on the "UI" module target and may therefore be said to correspond with the "UI" module target.

By way of these dependencies, the corresponding one or more test code structures for a respective module are identified as impacted test code structures in the impact map 510. Namely, the impact map 510 identifies the "CoreUnitTests" test target as being impacted by the "Core" module target, the "BIMUnitTests" test target as being impacted by the "BIM" module target, the "DrawingsUnitTest" test target as being impacted by the "Drawings" module target, and the "UIUnitTests" test target as being impacted by the "UI" module target. The computing platform may then determine that the corresponding one or more test code structures identified by the impact map 510 as impacted test code structures for a respective module directly correspond to the respective module.

In addition to identifying any test code structure that directly corresponds to each respective module in the impact map 510, the computing platform may also identify one or more test code structures that indirectly correspond to each respective module. Again, the computing platform may use the impact map 510 as a basis for identifying such indirectly corresponding test code structures. For example, the computing platform may identify one or more test code structures that indirectly correspond to a respective module as including any test code structures identified by any modules or other test code structures that are impacted by the respective module, as indicated by the impact map 510. To illustrate, because the impact map 510 further indicates that the "Core" module target impacts the "BIM" module target, the "BIMTests" test target, the "Drawings" module target, the "DrawingsTests" test target, the "UI" module target, and the "UITests" test target, the computing platform may determine that any tests that directly correspond to any of these impacted module targets and test targets also indirectly correspond to the "Core" module target. The computing platform may identify the tests that correspond to these impacted module targets and test targets in a similar manner as described above.

As a result of identifying the tests that directly and indirectly correspond to each respective module in the impact map 510, the computing system may generate a test map that includes the identified tests and indicates the respective module that they correspond to. FIG. 5C depicts an example of such a test map 520. As shown, the test map 520 indicates that the "Core" module target corresponds to a number of tests identified by the computing platform using the processes described above. Namely, the test map 520 indicates that the "Core" module target corresponds to the "CoreUnitTests" test target (which directly corresponds to the "Core" module target), the "BIMUnitTests" and "BIM-SnapshotTests" test targets (which directly corresponds to the "BIM" module target and therefore indirectly correspond to the "Core" module target by way of the "BIM" module target being impacted by the "Core" module target), the "DrawingsUnitTests" and "DrawingsSnapshotTests" test targets (which directly correspond to the "Drawings" module target and therefore indirectly correspond to the "Core" module target by way of the "Drawings" module target being impacted by the "Core" module target), and the "UIUnitTests" and "UISnapshotTests" test targets (which directly correspond to the "UI" module target and therefore indirectly correspond to the "Core" module target by way of the "UI" module target being impacted by the "Core" module target).

When identifying the tests to include in the test map 520, it is possible that the computing platform may identify duplicate tests that correspond to a respective module. For instance, when identifying the tests that indirectly correspond to the "Core" module target, the computing platform may identify two instances of the "BIMUnitTests" test target as corresponding to the "Core" module target (e.g., a first instance based on the impacted "BIM" module target and a second instance based on the impacted "BIMUnitTests" test target). As such, the computing platform may be configured to take steps to avoid including duplicate test targets in the test map 520 for any given module target. For instance, upon identifying a test target that corresponds to a respective module target, the computing platform may determine whether it has already identified that test target for the respective module target and, if so, refrain from adding a duplicate of the test target to the test map 520. Alternatively, after generating the test map 520, the computing platform may evaluate the identified test targets that correspond to each module target to determine whether the test map 520 includes duplicates of test targets for any given module target and, if so, remove the duplicates from the test map 520.

At block 412, based on the generated test map and the subset of source code files, the computing platform may select the targeted subset of available tests for inclusion in the dynamic test plan. Namely, the computing platform may select the targeted subset of available tests to include in the dynamic test plan based on the generated test map and the subset of changed source code files that are determined to be within the "module" test category. For instance, for each changed source code file that is determined to be within the "module" test category, the computing platform may (i) determine a given module to which the changed source code file belongs, (ii) based on the test map, identify the respective set of one or more tests that correspond to the given module, and then (iii) add the respective set of one or more tests that is identified for the particular module to the targeted subset of available tests to be included in the dynamic test plan.

To illustrate with an example, the computing platform may determine that a first changed source code file that is in the subset of source code files and that is in the "module" test category belongs to the "Drawings" module target. The computing platform may make this determination in various ways. As noted above, a respective module target may be associated with its source code files in various ways, such as by association through a common directory in data storage, association through data pointers, or any other data association techniques. As such, the computing platform may determine that the first changed source code file belongs to the "Drawings" module target based on the first changed source code file being stored in a directory corresponding to the "Drawings" module target, based on the first changed source code file being associated with a data pointer that points to the "Drawings" module target, or based on any other data association technique.

In response to determining that the first changed source code file belongs to the "Drawings" module target, the computing platform may refer to the test map 520 to identify the test targets that correspond to the "Drawings" module target and then include those test targets in the dynamic test plan. In the present example, because the test map 520 indicates that the "Drawings" module target corresponds with the "DrawingsUnitTests" and "DrawingsSnapshot-Tests," the computing platform may add these two test targets to the dynamic test plan.

Along similar lines, the computing platform may determine that a second changed source code file that is in the subset of source code files and that is in the "module" test category belongs to the "UI" module target. Based on this determination, the computing platform may refer to the test map 520 to identify the test targets that correspond to the "UI" module target and further include those test targets in the dynamic test plan. In the present example, because the test map 520 indicates that the "UI" module target corresponds with the "BIMUnitTests," "BIMSnapshotTests," "DrawingsUnitTests," "DrawingsSnapshotTests," "UIUnit-Tests," and "UISnapshotTests" test targets, the computing platform may further add these test targets to the dynamic test plan. Again, however, the computing platform may take steps to avoid including duplicate test targets in the dynamic test plan. For instance, because the computing platform already added the "DrawingsUnitTests" and "Drawing-sSnapshotTests" test targets to the dynamic test plan based on the first changed source code file, the computing platform may refrain from adding duplicate copies of these test targets to the dynamic test plan based on the second changed source code file (or the computing system may remove any such duplicate test targets from the dynamic test plan at a later time before execution of the dynamic test plan).

The computing platform may complete the dynamic test plan by applying this technique to every changed source code file that is in the subset of source code files and that is in the "module" test category. When doing so, the computing platform may determine, at a first time, a complete list of module targets that the changed source code files in the subset of source code files belong to. Then, at a second time, the computing platform may determine the test targets that correspond to the complete list of module targets and that are to be included in the dynamic test plan by referring to the test map 520 as described above.

At block 414, the computing platform may initiate the targeted test cycle by executing the dynamic test plan comprising the targeted subset of available tests. Using this technique, instead of executing all available tests for the software application, the computing platform may execute only a targeted subset of the available tests strategically identified by evaluating the particular source code files that have been changed in the manner described above. For instance, in the above example in which all of the changed source code files belong to one of the "Drawings" module or the "UI" module, the computing platform may only execute tests that correspond to those two modules while refraining from executing tests that do not correspond to those two modules, such as the "CoreUnitTests" test target, as indicated by the test map 520.

The examples described above only involve direct, or first-order, dependency and impact relationships. Namely, the dependency map 500 in FIG. 5A only identifies, for each respective module target and/or test target of the software application, any module target and/or test target that directly depends on the respective module target and/or test target. Likewise, the impact map 510 in FIG. 5B only identifies, for each respective module target of the software application, any module target and/or test target that is directly impacted by the respective module target. And consequently, the test map 520 only identifies, for each respective module target of the software application, tests that correspond to module targets and/or test targets that are directly impacted by the respective module target. However, it should be understood that the present disclosure also contemplates second-order or higher-order relationships as well. For instance, in some examples, the dependency map 500 may identify, for each respective module target and/or test target, both (i) any first-order module targets and/or test targets that directly depend on the respective module target and/or test target and (ii) any second-order module targets and/or test targets that directly depend on the first-order module targets and/or test targets. Additionally or alternatively, the impact map 510 may identify, for each respective module target, both (i) any first-order module targets and/or test targets that directly depend on the respective module target and (ii) any second-order module targets and/or test targets that directly depend on the first-order module targets and/or test targets. Consequently, the test map 520 may identify, for each respective module target, both (i) any tests corresponding to the respective module target's first-order impacted module targets and/or test targets and (ii) any tests corresponding to the respective module target's second-order impacted module targets and/or test targets. However, it should also be understood that including second-order or higher-order relationships in this manner may increase the number of tests included in the dynamic test plan, which may reduce some of the efficiency gains achieved by performing a targeted test cycle.

V. Conclusion

Example embodiments of the disclosed innovations have been described above. Those skilled in the art will understand, however, that changes and modifications may be made to the embodiments described without departing from the true scope and spirit of the present invention, which will be defined by the claims.

The invention claimed is:
1. A computing platform comprising:
  at least one processor;

at least one non-transitory computer-readable medium; and program instructions stored on the at least one non-transitory computer-readable medium that are executable by the at least one processor such that the computing platform is configured to:

identify, for a software application comprising source code files arranged into a plurality of modules each being associated with a respective subset of the source code files, a group of source code files that have changed relative to a prior state of the source code files:

for each respective source code file in the group of source code files, determine a respective file-level test category of the respective source code file that is selected from a set of test categories that comprises:

(i) a first file-level test category assigned to any of the group of the source code files that warrants running a full test cycle, (ii) a second file-level test category assigned to any of the group of the source code files that warrants running a targeted test cycle, and (iii) a third file-level test category assigned to any of the group of the source code files that does not warrant running a test cycle of any type;

based on the respective file-level test categories that are determined for the group of the source code files, determine whether to:

(i) initiate the full test cycle in response to at least one of the respective source code files in the group of the source code files being determined to be from the first file-level test category, (ii) initiate the targeted test cycle in response to none of the respective source code files in the group of the source code files being determined to be from the first file-level test category and at least one of the respective source code files in the group of the source code files being determined to be from the second file-level test category, or (iii) forgo the test cycle in response to all of the source code files in the group of the source code files being determined to be from the third file-level test category;

in response to determining to initiate the full test cycle, execute a predefined test plan comprising a full set of available module-level tests for the software application;

in response to determining to initiate the targeted test cycle:

(i) create a dynamic test plan comprising a targeted set of available module-level tests having less than all of the full set of available module-level tests for the software application by:

(a) obtaining a module-level dependency map that identifies any other module of the software application on which the respective module each of a first subset of the software application's plurality of modules directly depends;

(b) inverting the module-level dependency map and thereby generating a module-level impact map that identifies any other module of the software application that is impacted by each of a second subset of the software application's plurality of modules;

(c) identifying a respective set of one or more tests that correspond to each respective module of the second subset of the software application's plurality of modules by:

(1) identifying any one or more tests from the full set of available module-level tests that directly correspond to the respective module and (2) identifying any one or more tests from the full set of available module-level tests that directly correspond to a respective set of one or more other modules identified in the impact map as being impacted by the respective module, wherein the respective set of one or more tests that is identified for each respective module of the second subset of the software application's plurality of modules collectively define a module-level test map for the software application; and (d) selecting the targeted set of available module-level tests for the dynamic test plan by, for each respective source code file in the group of the source code files that is determined to be from the second file-level test category, (1) determining a given module to which the respective source code file belongs, (2) using the module-level test map to identify the respective set of one or more tests that correspond to the given module, and (3) selecting the respective set of one or more tests that correspond to the given module for inclusion in the targeted set of available module-level tests for the dynamic test plan; and (ii) initiate the targeted test cycle by executing the dynamic test plan comprising the targeted set of available module-level tests.

2. The computing platform of claim 1, wherein the software application further comprises a plurality of test code structures, each test code structure identifying a respective set of one or more tests for testing a respective one of the plurality of modules.

3. The computing platform of claim 2, wherein the module-level dependency map further identifies, for each respective test code structure of at least a subset of the software application's plurality of test code structures, any module of the software application on which the respective test code structure directly depends.

4. The computing platform of claim 3, wherein the module-level impact map further identifies a respective set of the test code structures of the software application that are impacted by each of the second subset of the software application's plurality of modules.

5. The computing platform of claim 1, wherein the module-level dependency map refrains from identifying any other module of the software application on which each of the first subset of the software application's plurality of modules indirectly depends.

6. The computing platform of claim 1, wherein the respective set of one or more other modules of the software application identified by the module-level impact map for each of the second subset of the software application's plurality of modules are directly impacted rather than indirectly impacted by each of the second subset of the software application's plurality of modules.

7. The computing platform of claim 1, wherein the module-level dependency map further identifies one or more other modules of the software application on which each of the first subset of the software application's plurality of modules indirectly depends.

8. The computing platform of claim 1, wherein the respective set of one or more other modules of the software application identified by the module-level impact map for each of the second subset of the software application's plurality of modules include one or more modules directly impacted and one or more modules indirectly impacted by each of the second subset of the software application's plurality of modules.

9. The computing platform of claim 1, wherein obtaining the module-level dependency map comprises generating the module-level dependency map based on data defining relationships between the plurality of modules of the software application.

10. The computing platform of claim 9, wherein the data defining relationships between the plurality of modules of the software application comprises a data object that defines relationships between targets that represent the plurality of modules of the software application.

11. A non-transitory computer-readable medium, wherein the non-transitory computer-readable medium is provisioned with program instructions that, when executed by at least one processor, cause a computing platform to:
identify, for a software application comprising source code files arranged into a plurality of modules each being associated with a respective subset of the source code files, a group of source code files that have changed relative to a prior state of the source code files;
for each respective source code file in the group of source code files, determine a respective file-level test category of the respective source code file that is selected from a set of test categories that comprises:
(i) a first file-level test category assigned to any of the group of the source code files that warrants running a full test cycle,
(ii) a second file-level test category assigned to any of the group of the source code files that warrants running a targeted test cycle, and
(iii) a third file-level test category assigned to any of the group of the source code files that does not warrant running a test cycle of any type;
based on the respective file-level test categories that are determined for the group of the source code files, determine whether to:
(i) initiate the full test cycle in response to at least one of the respective source code files in the group of the source code files being determined to be from the first file-level test category,
(ii) initiate the targeted test cycle in response to none of the respective source code files in the group of the source code files being determined to be from the first file-level test category and at least one of the respective source code files in the group of the source code files being determined to be from the second file-level test category, or
(iii) forgo the test cycle in response to all of the source code files in the group of the source code files being determined to be from the third file-level test category;
in response to determining to initiate the full test cycle, execute a predefined test plan comprising a full set of available module-level tests for the software application;
in response to determining to initiate the targeted test cycle:
(i) create a dynamic test plan comprising a targeted set of available module-level tests having less than all of the full set of available module-level tests for the software application by:
(a) obtaining a module-level dependency map that identifies any other module of the software application on which each of a first subset of the software application's plurality of modules directly depends;
(b) inverting the module-level dependency map and thereby generating a module-level impact map that identifies any other module of the software application that is impacted by each of a second subset of the software application's plurality of modules;
(c) identifying a respective set of one or more tests that correspond to each respective module of the second subset of the software application's plurality of modules by:
(1) identifying any one or more tests from the full set of available module-level tests that directly correspond to the respective module and
(2) identifying any one or more tests from the full set of available module-level tests that directly correspond to a respective set of one or more other modules identified in the impact map as being impacted by the respective module, wherein the respective set of one or more tests that is identified for each respective module of the second subset of the software application's plurality of modules collectively define a module-level test map for the software application; and
(d) selecting the targeted set of available module-level tests for the dynamic test plan by, for each respective source code file in the group of the source code files that is determined to be from the second file-level test category,
(1) determining a given module to which the respective source code file belongs,
(2) using the module-level test map to identify the respective set of one or more tests that correspond to the given module, and
(3) selecting the respective set of one or more tests that correspond to the given module for inclusion in the targeted set of available module-level tests for the dynamic test plan; and
(ii) initiate the targeted test cycle by executing the dynamic test plan comprising the targeted set of available module-level tests.

12. The non-transitory computer-readable medium of claim 11, wherein the software application further comprises a plurality of test code structures, each test code structure identifying a respective set of one or more tests for testing a respective one of the plurality of modules.

13. The non-transitory computer-readable medium of claim 12, wherein the module-level dependency map further identifies, for each respective test code structure of at least a subset of the software application's plurality of test code structures, any module of the software application on which the respective test code structure directly depends.

14. The non-transitory computer-readable medium of claim 13, wherein the module-level impact map further identifies a respective set of the test code structures of the software application that are impacted by each of the second subset of the software application's plurality of modules.

15. The non-transitory computer-readable medium of claim 11, wherein obtaining the module-level dependency map comprises generating the module-level dependency map based on data defining relationships between the plurality of modules of the software application.

16. A method carried out by a computing platform, the method comprising:
identifying, for a software application comprising source code files arranged into a plurality of modules each being associated with a respective subset of the source code files, a group of source code files that have changed relative to a prior state of the source code files:

for each respective source code file in the group of source code files, determining a respective file-level test category of the respective source code file that is selected from a set of test categories that comprises:
  (i) a first file-level test category assigned to any of the group of the source code files that warrants running a full test cycle,
  (ii) a second file-level test category assigned to any of the group of the source code files that warrants running a targeted test cycle, and
  (iii) a third file-level test category assigned to any of the group of the source code files that does not warrant running a test cycle of any type;

based on the respective file-level test categories that are determined for the group of the source code files, determining whether to:
  (i) initiate the full test cycle in response to at least one of the respective source code files in the group of the source code files being determined to be from the first file-level test category,
  (ii) initiate the targeted test cycle in response to none of the respective source code files in the group of the source code files being determined to be from the first file-level test category and at least one of the respective source code files in the group of the source code files being determined to be from the second file-level test category, or
  (iii) forgo the test cycle in response to all of the source code files in the group of the source code files being determined to be from the third file-level test category;

in response to determining to initiate the full test cycle, execute a predefined test plan comprising a full set of available module-level tests for the software application;

in response to determining to initiate the targeted test cycle:
  (i) creating a dynamic test plan comprising a targeted set of available module-level tests having less than all of the full set of available module-level tests for the software application by:
    (a) obtaining a module-level dependency map that identifies any other module of the software application on which each of a first subset of the software application's plurality of modules directly depends;
    (b) inverting the module-level dependency map and thereby generating a module-level impact map that identifies any other module of the software application that is impacted by each of a second subset of the software application's plurality of modules;
    (c) identifying a respective set of one or more tests that correspond to each respective module of the second subset of the software application's plurality of modules by:
      (1) identifying any one or more tests from the full set of available module-level tests that directly correspond to the respective module and
      (2) identifying any one or more tests from the full set of available module-level tests that directly correspond to a respective set of one or more other modules identified in the impact map as being impacted by the respective module, wherein the respective set of one or more tests that is identified for each respective module of the second subset of the software application's plurality of modules collectively define a module-level test map for the software application; and
    (d) selecting the targeted set of available module-level tests for the dynamic test plan by, for each respective source code file in the group of the source code files that is determined to be from the second file-level test category,
      (1) determining a given module to which the respective source code file belongs,
      (2) using the module-level test map to identify the respective set of one or more tests that correspond to the given module, and
      (3) selecting the respective set of one or more tests that correspond to the given module for inclusion in the targeted set of available module-level tests for the dynamic test plan; and
  (ii) initiating the targeted test cycle by executing the dynamic test plan comprising the targeted set of available module-level tests.

17. The method of claim 16, wherein the software application further comprises a plurality of test code structures, each test code structure identifying a respective set of one or more tests for testing a respective one of the plurality of modules.

18. The method of claim 17, wherein the module-level dependency map further identifies, for each respective test code structure of at least a subset of the software application's plurality of test code structures, any module of the software application on which the respective test code structure directly depends.

19. The method of claim 18, wherein the module-level impact map further identifies a respective set of the test code structures of the software application that are impacted by each of the second subset of the software application's plurality of modules.

20. The method of claim 16, wherein obtaining the module-level dependency map comprises generating the module-level dependency map based on data defining relationships between the plurality of modules of the software application.

* * * * *